United States Patent [19]

Tahara

[11] Patent Number: 5,691,767
[45] Date of Patent: Nov. 25, 1997

[54] VIDEO CONFERENCING SYSTEM WITH HIGH RESOLUTION STILL IMAGE CAPABILITY

[75] Inventor: Katsumi Tahara, Kanagawa, Japan

[73] Assignee: Sony Corporation, Tokyo, Japan

[21] Appl. No.: 638,987

[22] Filed: Apr. 24, 1996

Related U.S. Application Data

[63] Continuation of Ser. No. 958,739, Oct. 9, 1992, abandoned.

[30] Foreign Application Priority Data

Oct. 15, 1991 [JP] Japan .................... 3-266370

[51] Int. Cl.$^6$ ............................................. H04N 7/24
[52] U.S. Cl. ............................................................ 348/384
[58] Field of Search ............................. 358/136, 133, 358/85, 261.3, 432, 433, 138; 379/53, 54, 93, 96, 97, 98; 348/14, 15, 22, 23, 24, 390, 384, 424, 425, 392; H04N 7/13

[56] References Cited

U.S. PATENT DOCUMENTS

| | | | |
|---|---|---|---|
| 4,682,225 | 7/1987 | Graham | 358/138 |
| 4,692,801 | 9/1987 | Ninomiya et al. | 358/138 |
| 4,764,805 | 8/1988 | Rabbani et al. | 358/138 |
| 4,774,562 | 9/1988 | Chen et al. | 358/138 |
| 4,802,005 | 1/1989 | Kondo | 358/138 |
| 4,873,573 | 10/1989 | Thomas et al. | 348/416 |
| 4,924,311 | 5/1990 | Ohki et al. | 358/85 |
| 5,063,440 | 11/1991 | Hong | 379/53 |
| 5,093,720 | 3/1992 | Krause et al. | 348/452 |
| 5,136,371 | 8/1992 | Savatier et al. | 364/725 |
| 5,136,628 | 8/1992 | Araki et al. | 358/85 |
| 5,142,362 | 8/1992 | Masera et al. | 358/133 |
| 5,150,432 | 9/1992 | Ueno et al. | 382/56 |
| 5,175,618 | 12/1992 | Ueda et al. | 348/416 |
| 5,191,415 | 3/1993 | Matsunaga | 358/138 |
| 5,192,999 | 3/1993 | Graczyk et al. | 348/571 |
| 5,212,742 | 5/1993 | Normile et al. | 382/56 |

FOREIGN PATENT DOCUMENTS

| | | |
|---|---|---|
| 0 320 828 | 6/1989 | European Pat. Off. . |
| 0 411 906 | 2/1991 | European Pat. Off. . |

OTHER PUBLICATIONS

Trends in Telecommunications vol. 2, No. 1, 1986, Netherlands pp. 13–27 J. Speidel [A Terminal For Transmission of Full–Motion Pictures and Graphics, High–Quality Speech and Data With 2 MBIT/S For Video–Teleconferences and Visual Telephony] * p. 13, right column—p. 17, right column, line 11 * * p. 21, right column, line 4—p. 22, left column, line 5 *.

Patent Abstracts of Japan vol. 15, No. 258 (E–1084)28 Jun. 1991 & JP–A–30 82 257 (Canon Inc) 8 Apr. 1991 * abstract *.

*Primary Examiner*—Tommy P. Chin
*Assistant Examiner*—Bryan S. Tung
*Attorney, Agent, or Firm*—William S. Frommer; Alvin Sinderbrand

[57] ABSTRACT

Image data of four frames are stored in four memories and the image data from the four memories are sequentially transmitted, whereby still picture image data having a resolution twice the resolution of a common intermediate format (CIF) image based on the video CODEC recommendation H.261 can be transmitted.

17 Claims, 12 Drawing Sheets

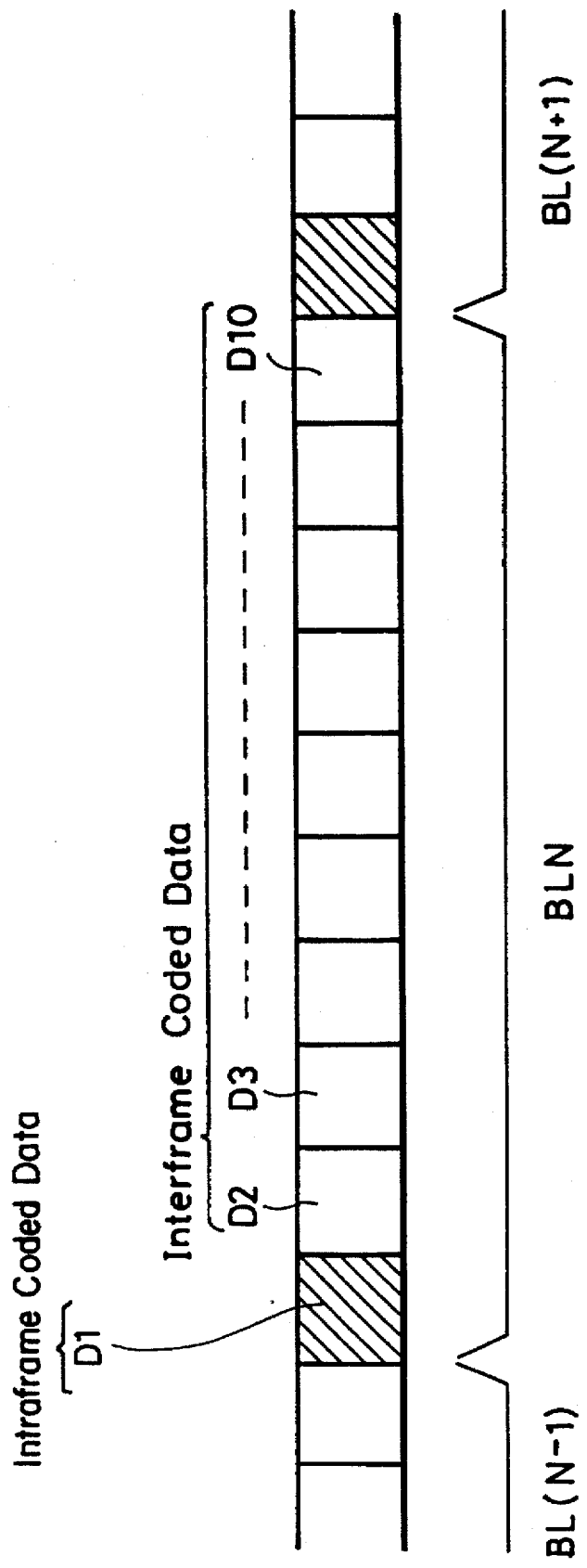

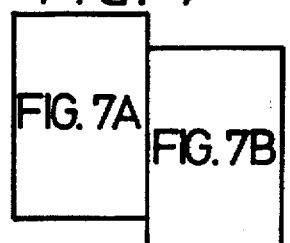
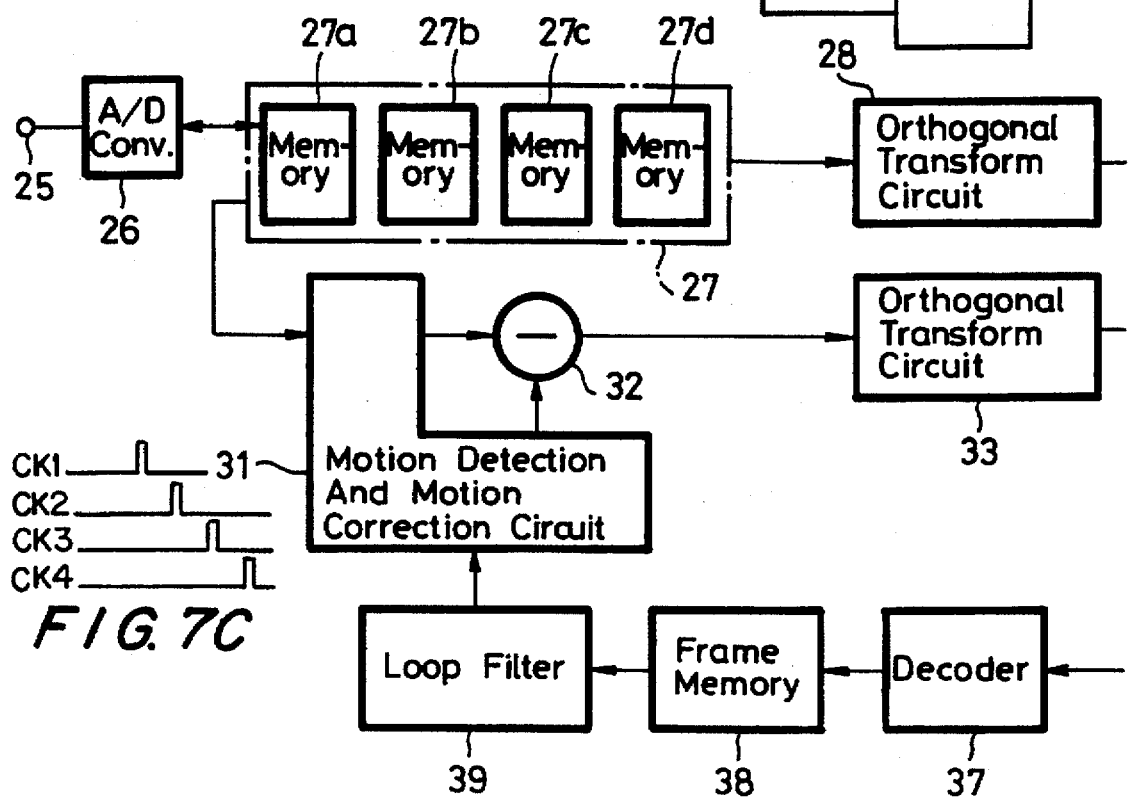
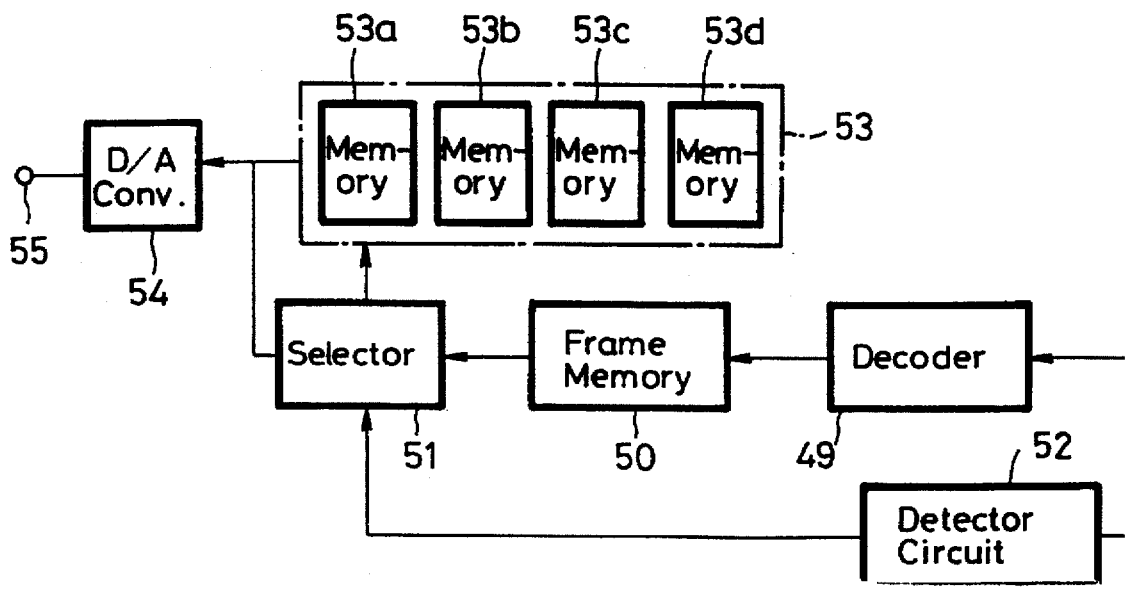

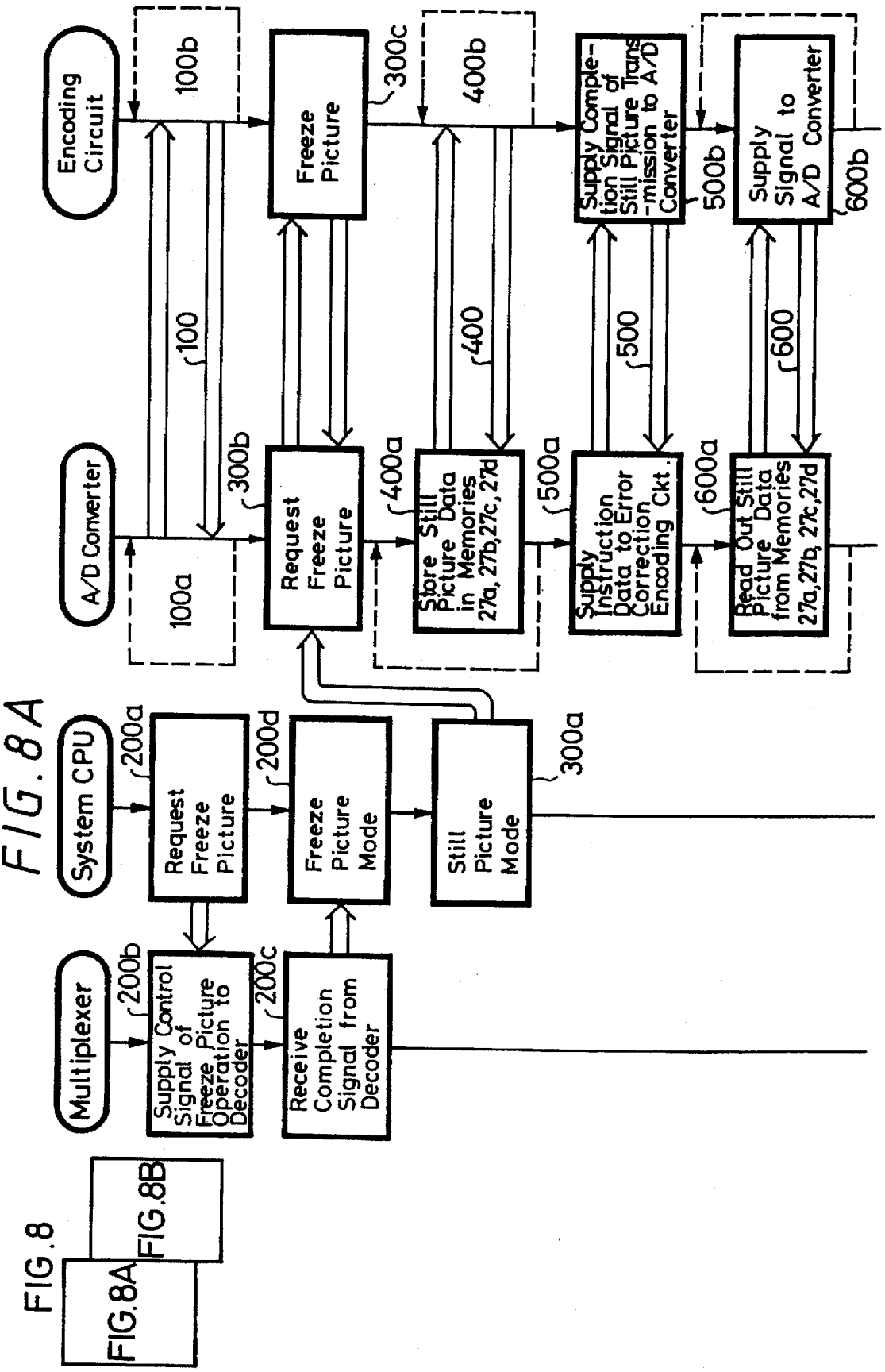

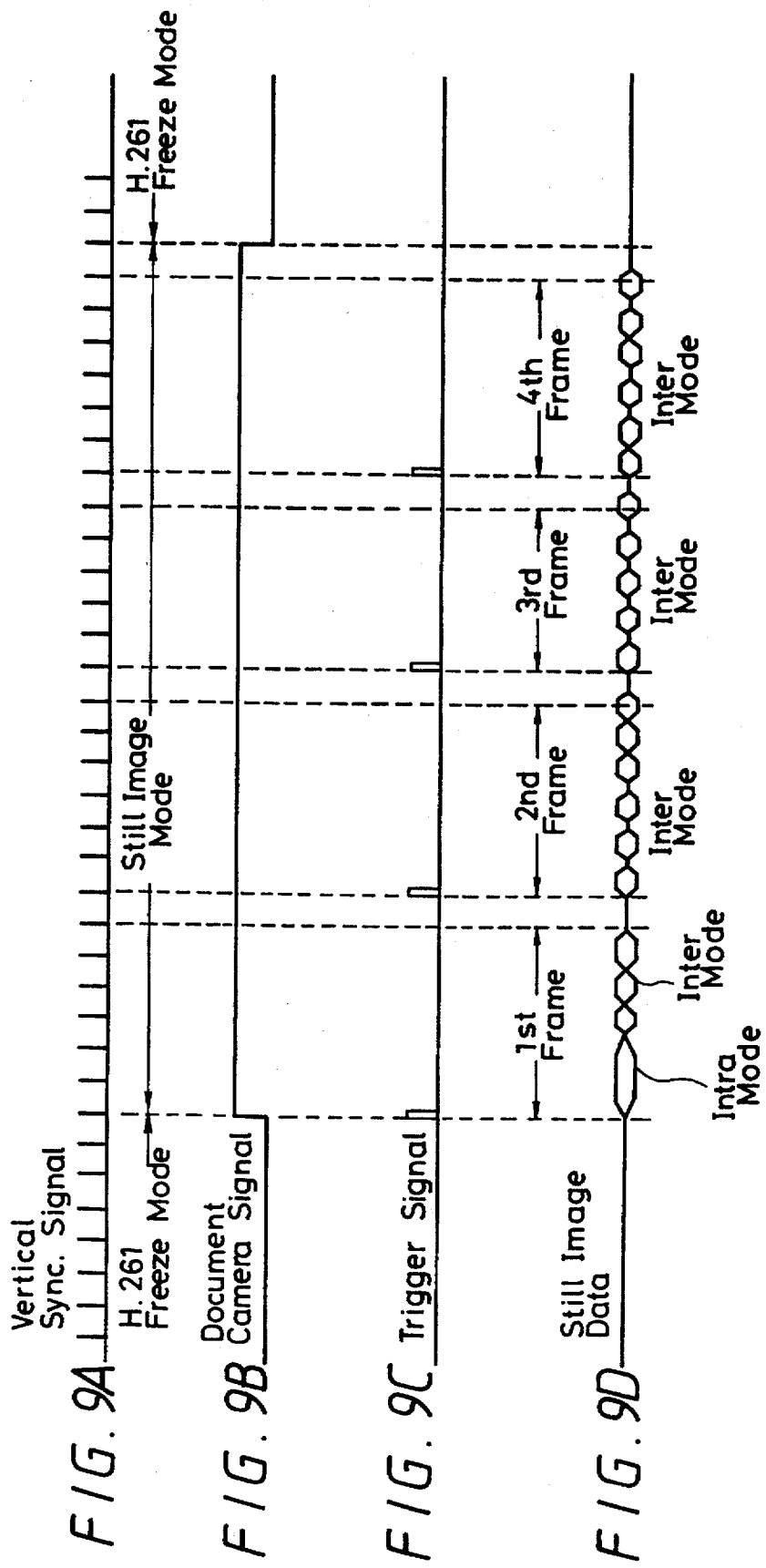

VIDEO CONFERENCING SYSTEM WITH HIGH RESOLUTION STILL IMAGE CAPABILITY

This application is a continuation of application Ser. No. 07/958,739, filed Oct. 9, 1992 now abandoned.

BACKGROUND OF THE INVENTION

1. Field of the Invention

The present invention relates to an information transmitting apparatus and an information receiving apparatus which are suitable for use with a videoconferencing system, a moving image telephone system or the like, for example.

2. Description of the Prior Art

Recently, there has been proposed a transmitting system in which still image information and moving image information are combined with audio information for transmission.

In a videoconferencing system or the like, for example, users in distant places can communicate with each other in audio and video via so-called audio-visual (AV) appliances.

When the users in distant places communicate with each other by means of the combination of audio and video in this videoconferencing system, these audio and video informations are coded and then transmitted, respectively.

The encoding of the image information is standardized according to the video CODEC (coder and decoder) recommendation H.261 that has been established on December 1990 by Comité Consultatif International des Télégraphique et Téléphonique (CCITT) that is under the control of International Telecommunication Union (ITU).

The application of the moving image encoding covers broadcasting communication, for example, as a use in which a standard television receiver or high definition (HD) television receiver is employed as a signal source to effect the signal transmission to the remote place and as a storage use wherein the location signal processing is effected.

A video format according to the above recommendation H.261 is a common intermediate format (CIF: Common Intermediate Format) which can solve problems caused by different television systems in the areas (whole world) and which can effect the communication between the CODECs.

A resolution of an image based on the CIF is 352 dots (in the horizontal direction) ×288 dots (in the vertical direction).

A structure of image data to be transmitted is as shown in FIG. 1.

As shown in FIG. 1 of the accompanying drawings, one picture (each of 1 to 12 in FIG. 1) forms a group of block (GOB) (1 to 33 in FIG. 1). The GOB comprises 33 Macro-blocks each including four luminance information blocks Y1–Y4 and two color information blocks CB and CR. Further, one luminance information block is formed of 8 pixels by 8 pixels.

A source coded output, that is, a quantized index of conversion coefficient, motion vector information, block type information or the like is further compressed by a variable length coding process utilizing a statistical feature and then multiplexed to one bit sequence.

Each block of the 6 blocks constituting the above-mentioned macro-block is coded as a unit.

Image data transmitted to the transmission line is added with a macro-block attribute information at every 6 blocks comprising the macro-block, added with a GOB header at every macro-block forming the GOB and is also added with a picture header at every GOB comprising the picture, thereby converted into data sequence.

In the transmission of image data, an image information of an interpolating frame is formed at the transmission side and then transmitted to the receiving side.

Transmission data DATA is composed of image data that is processed according to a high-efficiency coding process, as shown in FIGS. 2A, 2B and FIG. 3.

In the high-efficiency coding process, when moving picture images PC1, PC2, PC3, . . . are converted into digital data at timing points t=t1, t2, t3, . . . and then transmitted to the receiving side, digital data to be transmitted is compressed by utilizing the fact such that the video signal has a strong auto-correlation to thereby enhance a transmission efficiency. Accordingly, an interframe coding processing and an intraframe coding processing are executed.

According to the intraframe coding processing, as shown in FIG. 2A, the images PC1, PC2, PC3, . . . are compressed in such a manner that a difference between adjacent image data arranged along the horizontal scanning line direction, for example, in a one or two-dimensional fashion, is obtained and encoded. Thus, transmission frame image data of compressed number of bits are formed with respect to the respective images PC1, PC2, PC3, . . . .

According to the interframe coding processing, as shown in FIG. 2B, images PC12, PC23 expressing deviations between adjacent images PC1, PC2 and PC2 and PC3, . . . are sequentially obtained. These images PC12, PC23, . . . are transmitted together with image data (composed of intraframe coding data) of initial image PC1 at the timing point t=t1 as vector data $x_0, x_1, x_2, x_3, \ldots$ and difference data between sequentially adjacent images.

Therefore, the video signal can be coded into digital data having fewer bits according to the high-efficiency coding processing and then transmitted as compared with the case such that all image data of the images PC1, PC2, PC3, . . . are transmitted.

Image data to be transmitted is divided into blocks of a predetermined frame number (e.g., 10 frames) and block data . . . BL(N−1), BLN, BL(N+1) . . . are sequentially coded according to the high-efficiency coding processing and then transmitted from the transmission side to the transmission line, in that order.

The block data . . . BL(N−1), BLN, BL(N+1) . . . include intraframe coding processed data as first frame data D1 and intraframe coding processed data as second to tenth frame data D2 to D10.

The intraframe coding processed data are composed of difference data of all pixels forming the image of one frame as earlier noted with reference to FIG. 2A. The receiving side reproduces frame image data representative of one picture by sequentially adding the difference data of one frame.

On the other hand, the second to tenth frame data D2 to D10 that are the intraframe coding data of only the pixels which are changed in the consecutive frame image are converted into motion vector data and difference data representative of a difference between the intraframe images.

Therefore, while the first frame data D1 comprises transmission data whose compression efficiency is relatively low (i.e., having a large number of bits) since the first frame includes data representative of differences of all pixels of one frame, the second to tenth frame data D2 to D10 comprise transmission data whose compression efficiency is relatively high (i.e., having a less bit number) and which represents only motion between image data.

FIG. 4 of the accompanying drawings shows a universal communication format based on the above common intermediate (CIF) format.

As shown in FIG. 4, image data from a video camera 31 (e.g., PAL system video camera) in which a frequency is 50 Hz and the number of scanning lines is 625 or image data from a video camera 33 (e.g., NTSC system video camera) in which a frequency is 60 Hz and the number of scanning lines is 525 is converted by a converter 32 or 34 into image data of the CIF format.

Then, this image data is coded by a coder 35 and transmitted. The image data thus coded by the coder 35 and then transmitted is decoded by a decoder 36 and converted into the image data of the CIF format.

Further, the image data of the CIF format is converted by a converter 37 or 39 into the original video signal and a television receiver 38 (e.g., PAL system television receiver) having a frequency of 50 Hz and 625 scanning lines or a television receiver 40 (e.g., NTSC television receiver) having a frequency of 60 Hz and 525 scanning lines displays the video signal thus converted.

In the above communication process, the recommendation H.261 covers the coder 35 and the decoder 36.

FIG. 5 of the accompanying drawings shows in block form an example of a videoconferencing system. The example of the videoconferencing system will hereinafter be described with reference to FIG. 5.

In FIG. 5, reference numeral 41 depicts a terminal apparatus. The terminal apparatus 41 can communicate with other terminal apparatus 42 via a network 43 under the control of a multi-point control unit 44.

An arrangement of the terminal apparatus 41 will be described below. In this case, the terminal apparatus 42 is constructed similarly to the terminal apparatus 41 that will be described below and therefore need not be described herein.

Upon transmission, a video signal supplied from a video input and output device 45 is supplied to a video CODEC (coder and decoder) 46, in which it is converted into image data according to the common intermediate format (CIF) and processed according to some suitable processes such as a filtering process or the like in order to eliminate noise. Then, the image data thus processed is supplied to a multi-media multiplexing/separating device 53.

A device that supplies the image data to the video input and output device 45 is not limited and any device might be used so long as it can supply image data to the video input and output device 45.

On the other hand, an audio signal from an audio input and output device 48 is supplied to an audio CODEC 49, in which it is coded and delayed by a predetermined delay time. Then, the audio data thus processed is supplied to the multi-media multiplexing/separating device 53.

Information from a telematic device 51 is supplied to the multi-media multiplexing/separating device 53.

Respective data supplied to the multi-media multiplexing/separating device 53 are multiplexed by the multi-media multiplexing/separating device 53 under the control of a system control device 52 and then fed to other terminal apparatus 42 via a network interface 54 and the network 43.

When the transmitted signal from other terminal apparatus 42 is received, a multiplexed signal is supplied through the network interface 54 to the multi-media multiplexing/separating device 53, in which it is separated to provide video data and audio data. The video data is supplied to the video CODEC 46, the audio data is supplied through a delay device 50 to the audio CODEC 49, and telematic device data is supplied to the telematic device 51, respectively.

The coded video data is decoded into the original video signal by the video CODEC 46 and then supplied through the video input and output device 45 to a television receiver (not shown) or the like, whereby it is displayed on a picture screen of the television receiver as a television picture.

The coded audio data is decoded by the audio CODEC 49 into the original audio signal and then supplied to a loudspeaker (not shown) or the like, whereby it is emanated from the loudspeaker or the like.

In the above-mentioned videoconferencing system, the video CODEC 46 covers the range of the video recommendation H.261.

As earlier noted, the video CODEC 46 is adapted to encode image data or the like upon transmission of the image data or the like and to decode the encoded image data upon reception of the image data.

FIG. 6 of the accompanying drawings shows a block diagram of the transmitting apparatus (coder) and a receiving apparatus (decoder) of image data.

To simplify the description, the CODEC is not illustrated in FIG. 6 but illustrated as the coder of the terminal apparatus on the transmitting side and as the decoder of the terminal apparatus on the receiving side. Therefore, a decoder of the terminal apparatus on the transmitting side and the coder of the terminal apparatus on the receiving side are not shown in FIG. 6, respectively.

In FIG. 6, reference numeral 1 depicts an input terminal to which the video signal from the video input and output device or the like described with reference to FIG. 5 is supplied. A video signal from the input terminal 1 is converted by an analog-to-digital (A/D) converter 2 and then fed to a motion detection and motion correction circuit 3.

The motion detection and motion correction circuit 3 carries out the motion correction interframe prediction on 16×16 pixels on the basis of the digital video signal from the A/D converter 2 and image data of one preceding frame from the frame memory 23 and supplies only motion information of the digital video signal to a judging circuit 4.

The judging circuit 4 determines on the basis of an overflow information from a buffer 8 whether the motion information from the motion detection and motion correction circuit 3 is inter-mode or intra-mode.

According to the inter-mode, the difference between the preceding and succeeding frames is derived to thereby obtain an interframe difference signal. Whereas, according to the intra-mode, a lot of information is obtained from one frame to thereby obtain an intraframe prediction signal.

Data from the judging circuit 4 is supplied to an orthogonal transform circuit 5.

The orthogonal transform circuit 5 orthogonally transforms the data from the judging circuit 4 in a block size of 8×8 pixels and supplies the data thus transformed to a quantizer circuit 6.

According to the orthogonal transform by the orthogonal transform circuit 5, the data (time base data) from the judging circuit 4 is converted into frequency axis data having a small amount of information.

The quantizer circuit 6 quantizes the converted data from the orthogonal transform circuit 5 on the basis of the overflow information from the buffer 8 and supplies the image data thus quantized to a Huffman coding circuit 7.

The image data thus quantized by the quantizer circuit 6 is supplied to an inverse quantizer circuit 20 and thereby inversely quantized by this inverse quantizer circuit 20. Then, the thus processed image data is inversely orthogonally transformed by an inverse orthogonal transform circuit 21, decoded by a decoder (local decoder) 22 and then fed to a frame memory 23.

The image data from the frame memory 23 is supplied to a loop filter 24, in which it is removed in distortion between blocks and then fed to the above motion detection and motion correction circuit 3.

The Huffman coding circuit 7 is adapted to code the image data from the above quantizer circuit 7 using a short code corresponding to the number of "0" s, i.e., a run-length code.

The image data from the Huffman coding circuit 7 is supplied through the buffer 8 to an error correction coding circuit 9.

The error correction coding circuit 9 adds an error correction code to the image data from the buffer 8 so as to protect the image data from noise within a transmission line (corresponding to the network 43 described with reference to FIG. 5 or the like).

The image data from the error correction coding circuit 9 is supplied to a multiplexer 10, and the multiplexer 10 converts various data in addition to this image data into variable length codes and multiplexes the same into a code sequence of a predetermined data structure.

The image data from the multiplexer 10 is supplied to a demultiplexer 11 on the receiving side.

Data in the code sequence is demultiplexed by the demultiplexer 11 on the receiving side to be converted into the original image data and then supplied through an error correction coding circuit 12 to an inverse Huffman coding circuit 13.

The above data is processed by the inverse Huffman coding circuit 13 into quantized image data. This quantized image data is then supplied to an inverse quantizer circuit 14, in which it is inversely quantized to provide image data of frequency axis.

The image data of frequency axis is supplied to the inverse orthogonal transform circuit 14, in which it is converted into image data of time base. This image data of time base is supplied to a decoder 16, in which it is decoded to the original image data. Then, this image data is temporarily stored in a frame memory 17 and supplied to a digital-to-analog (D/A) converter 18, in which it is converted to an analog video signal.

This analog video signal is supplied through an output terminal 19 and the video output device 45, described with reference to FIG. 5, to a television receiver (not shown) or the like, thereby displayed on a picture screen as a received picture.

In the videoconferencing system or the like in which the moving image is transmitted on the basis of the contents of the video recommendation H.261, when an image such as a document or the like is transmitted as a still picture, such image is transmitted according to its own mode because the video recommendation H.261 has no regulation on the transmission of the still picture.

However, in the videoconferencing system or the like in which the processing in the transmission regulated according to the video recommendation H.261 is effected, if a different processing is carried out only when the still picture is transmitted, there are then disadvantages from an efficiency and circuit scale standpoint. Therefore, it is preferable that a similar processing to the transmission of still picture is carried out.

In the videoconferencing system (or other transmission system, etc.) according to the standards of video recommendation H.261, when the processing based on the regulation of the video recommendation H.261 is carried out to transmit a still picture, a resolution of the still picture is 352 dots in the horizontal direction and 288 dots in the vertical direction similarly to the moving image.

However, the still picture having a resolution of 352 dots (horizontal direction) ×288 dots (vertical direction) cannot satisfy requirements of the receiving side which requires a still picture image of high accuracy. Therefore, the transmission of still picture having higher resolution is desired.

OBJECTS AND SUMMARY OF THE INVENTION

Accordingly, it is an object of the present invention to provide an improved information transmitting apparatus and an improved information receiving apparatus in which the aforesaid shortcomings and disadvantages of the prior art can be eliminated.

More specifically, it is an object of the present invention to provide an information transmitting apparatus and an information receiving apparatus which can transmit and receive a still picture whose resolution is higher than the resolution defined in on the video CODEC recommendation H.261.

It is another object of the present invention to provide an information transmitting method and an information receiving method which can transmit and receive a still picture whose resolution is higher than the resolution defined in the video CODEC recommendation H.261.

It is a further object of the present invention to provide an information transmitting apparatus and an information receiving apparatus which can be suitably applied to a videoconferencing system, a moving picture telephone system or the like.

According to a first aspect of the present invention, since frames N (N is an integer) times the transmission frame are prepared, a first pixel is stored in a first frame memory, a second pixel is stored in a second frame memory, . . . , N–1' th pixel is stored in N–1' th frame memory, and N' th pixel is stored in N' th frame memory, thereby obtaining a still picture having pixels the number of which is integral times the number of pixels in a designated moving picture transmission system, there is then the advantage such that a still picture having a resolution higher than that of the image according to the designated moving picture transmission system can be transmitted.

According to a second aspect of the present invention, since frames N (N is an integer) times the transmission frame are prepared, a first pixel is stored in a first frame memory, a second pixel is stored in a second frame memory, . . . , N–1' th pixel is stored in N–1' th frame memory, and N' th pixel is stored in N' th frame memory, thereby receiving a still picture having pixels the number of which is integral times the number of pixels in a designated moving picture transmission system, there is then the advantage such that a still picture having a resolution higher than that of the image according to the designated moving picture transmission system can be received.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 3 is a schematic diagram used to explain a block of image data;

FIGS. 9A through 9D are respectively timing charts used to explain the information transmitting apparatus and information receiving apparatus according to the embodiment of the present invention.

DETAILED DESCRIPTION OF THE PREFERRED EMBODIMENT

An information transmitting apparatus and an information receiving apparatus according to an embodiment of the present invention will hereinafter be described in detail with reference to FIG. 7.

Figure 7B:
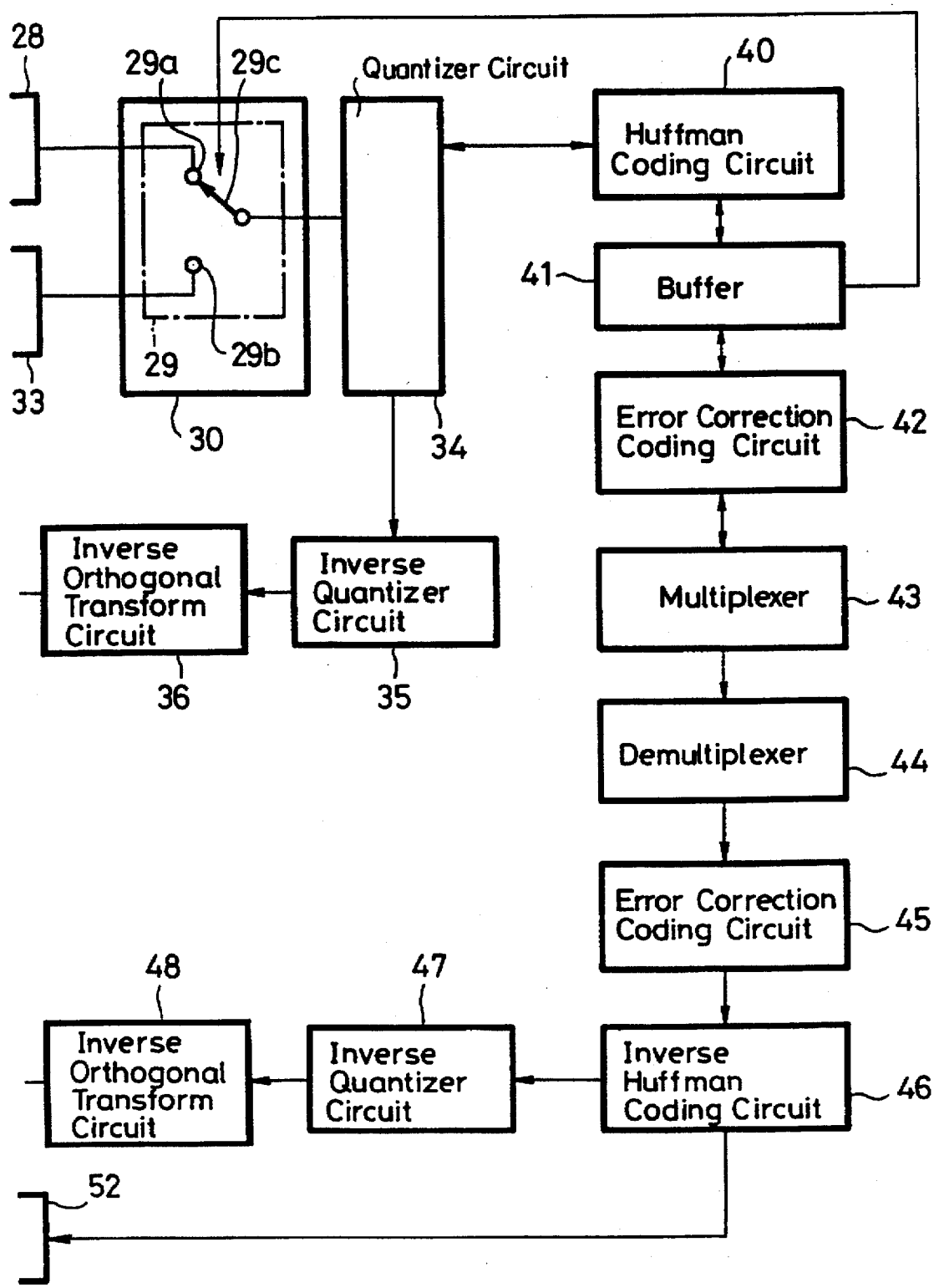
FIG. 7 shows the interlocking of FIGS. 7A and 7B, which together are a block diagram showing an information transmitting apparatus and information receiving apparatus according to an embodiment of the present invention.
FIG. 7C shows sampling clocks used in the apparatus shown in FIGS. 7A and 7B.

FIG. 7, which is formed of FIGS. 7A, 7B drawn on two sheets of drawings so as to permit the use of a suitably large scale, is a block diagram showing an overall arrangement of the information transmitting and information receiving apparatus according to the embodiment of the present invention. In FIG. 7, like parts corresponding to those of FIGS. 1 to 6 are marked with the same references and therefore need not be described in detail.

Referring to FIG. 7, the analog video signal from a device, which outputs image data or the like, is supplied to the input terminal 25. The video signal from the input terminal 25 is supplied to the A/D converter circuit 26.

The A/D converter circuit 26 includes therein, for example, a CPU (central processing unit), not shown, and converts the video signal from the input terminal 25 into digital image data. The digital image data thus converted is written in each of memories 27a, 27b, 27c and 27d constructing the memory 27 in the still image mode which will be described later on.

The A/D converter circuit 26 extracts image data of 4 frames by sampling moving image data or still image data of one frame each with sampling clocks having four different phases, for example, as shown in FIG. 7C (i.e., phases of sampling clocks are displaced).

Then, image data a sampled by the first sampling clock, for example, is added with an image identifier (ID) and then written in the memory 27a, image data b sampled by the second sampling clock is added with the image identifier and then written in the memory 27b, image data c sampled by the third sampling clock is added with the image identifier and then written in the memory 27c, and image data d sampled by the fourth sampling clock is added with the image identifier and then written in the memory 27d.

The image data a, b, c and d stored in these memories 27 (27a to 27d) are sequentially read out therefrom and supplied to the orthogonal transform circuit 28 as intra-mode data (intraframe difference signal).

Figure 1:
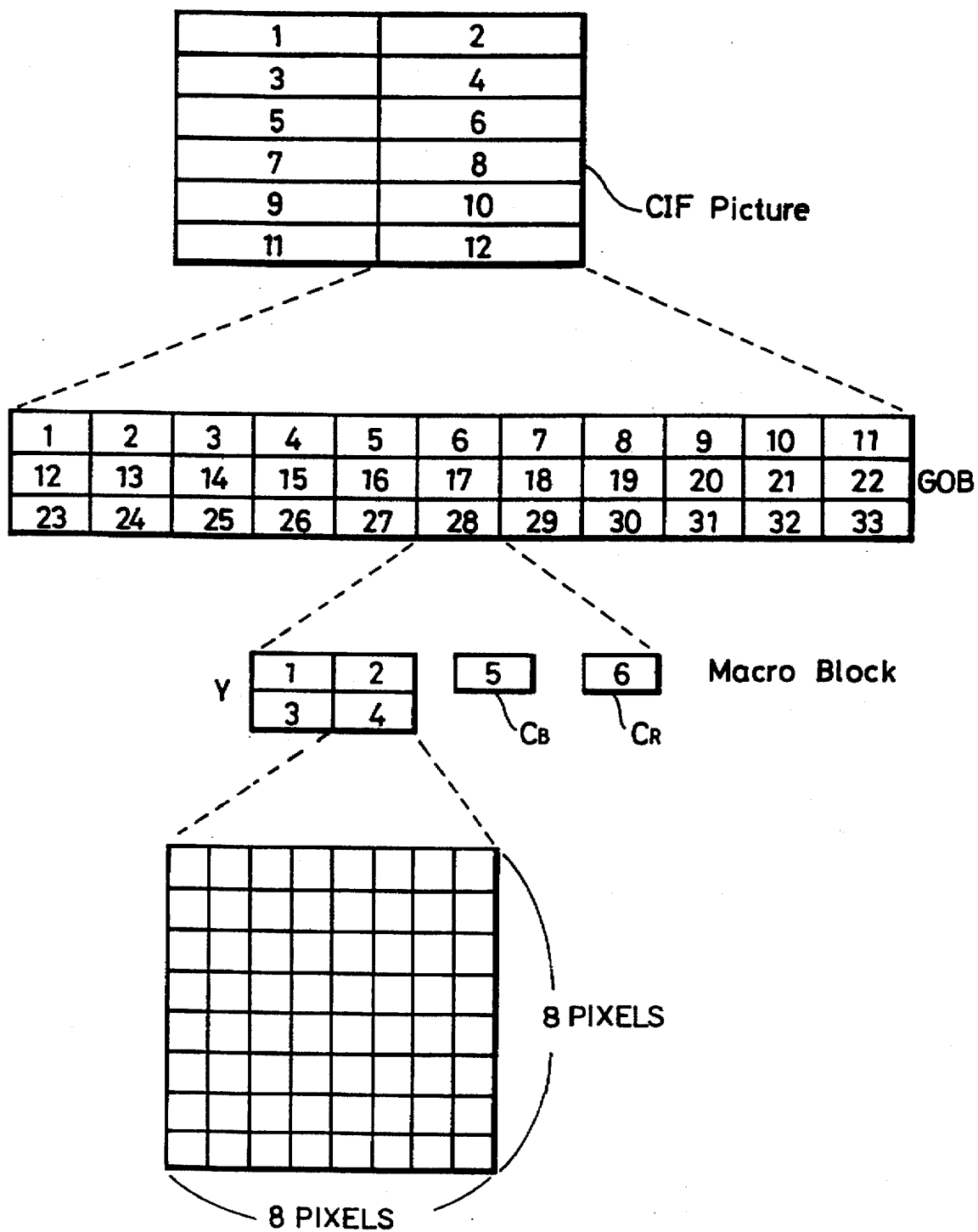
FIG. 1 is a diagram showing a structure of image data.
Figures 2A, 2B:
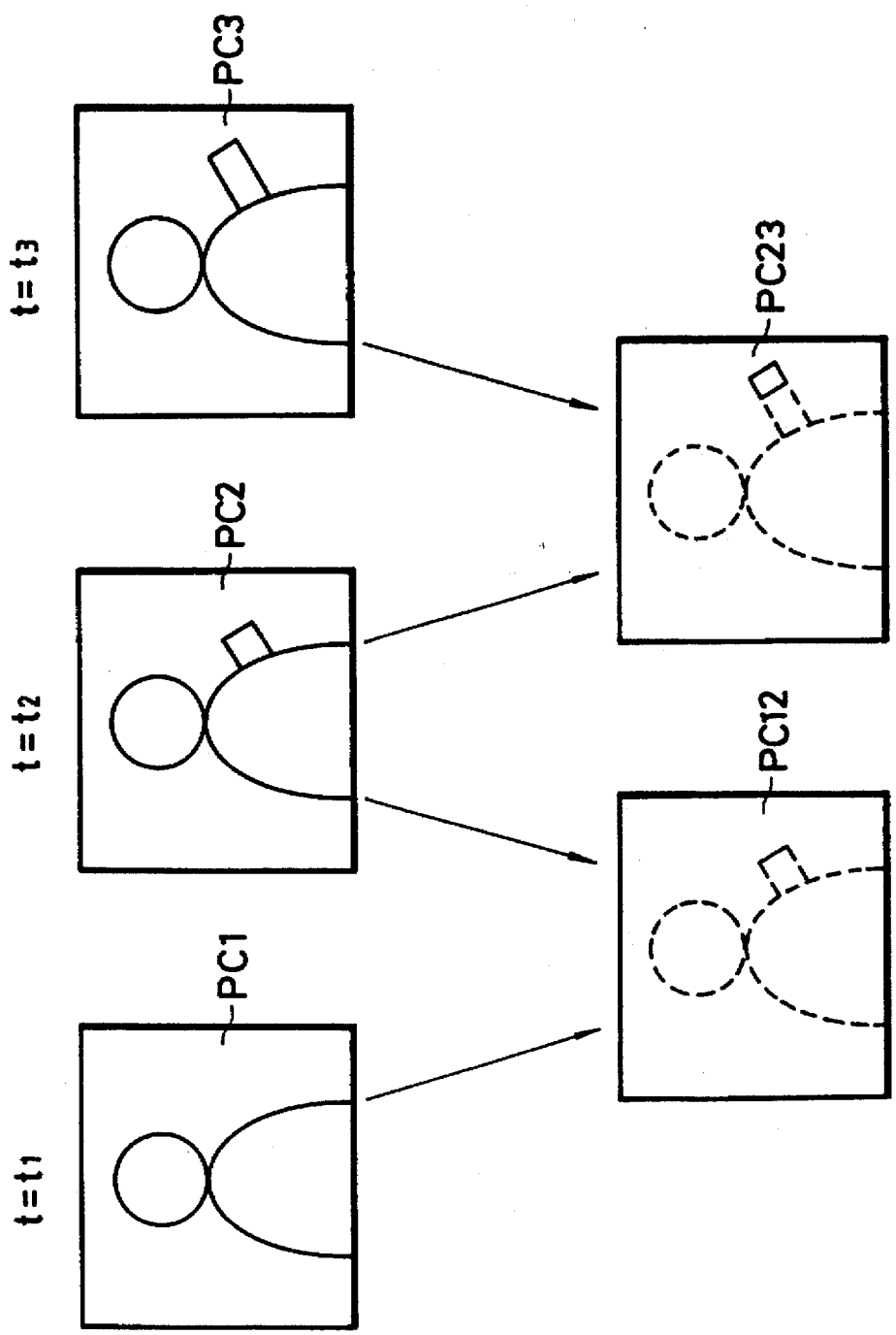
FIGS. 2A and 2B are respectively schematic diagrams used to explain a high-efficiency coding system.
Figure 4:
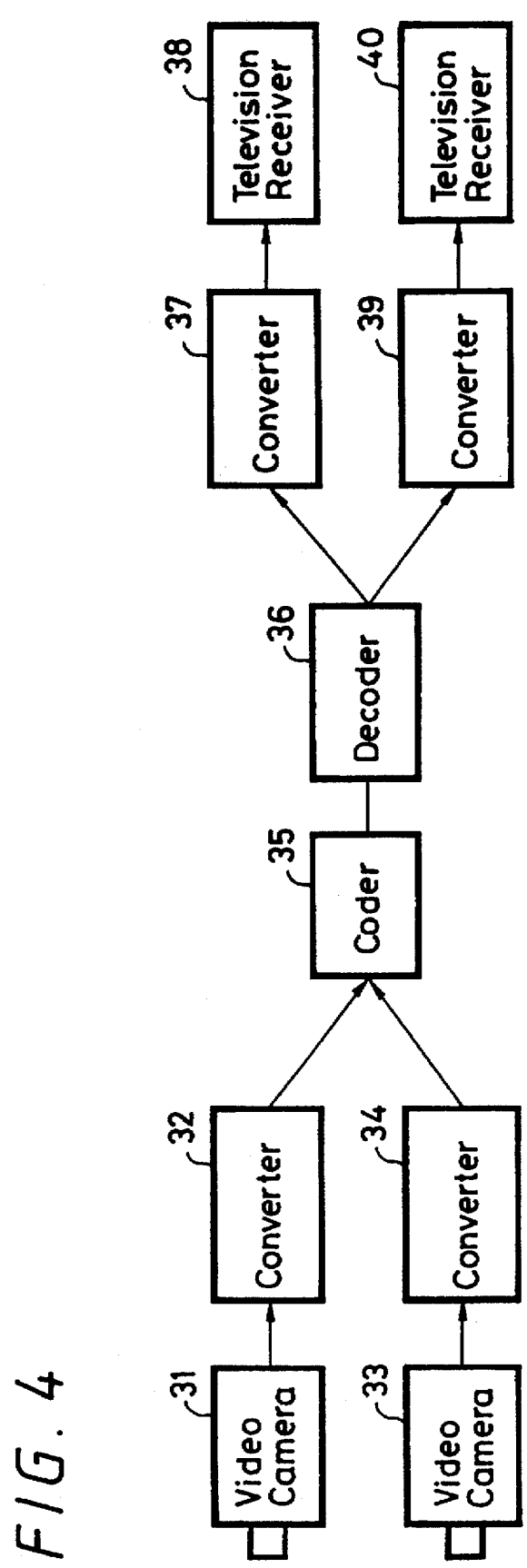
FIG. 4 is a block diagram showing an outline of a communication system.
Figure 5:
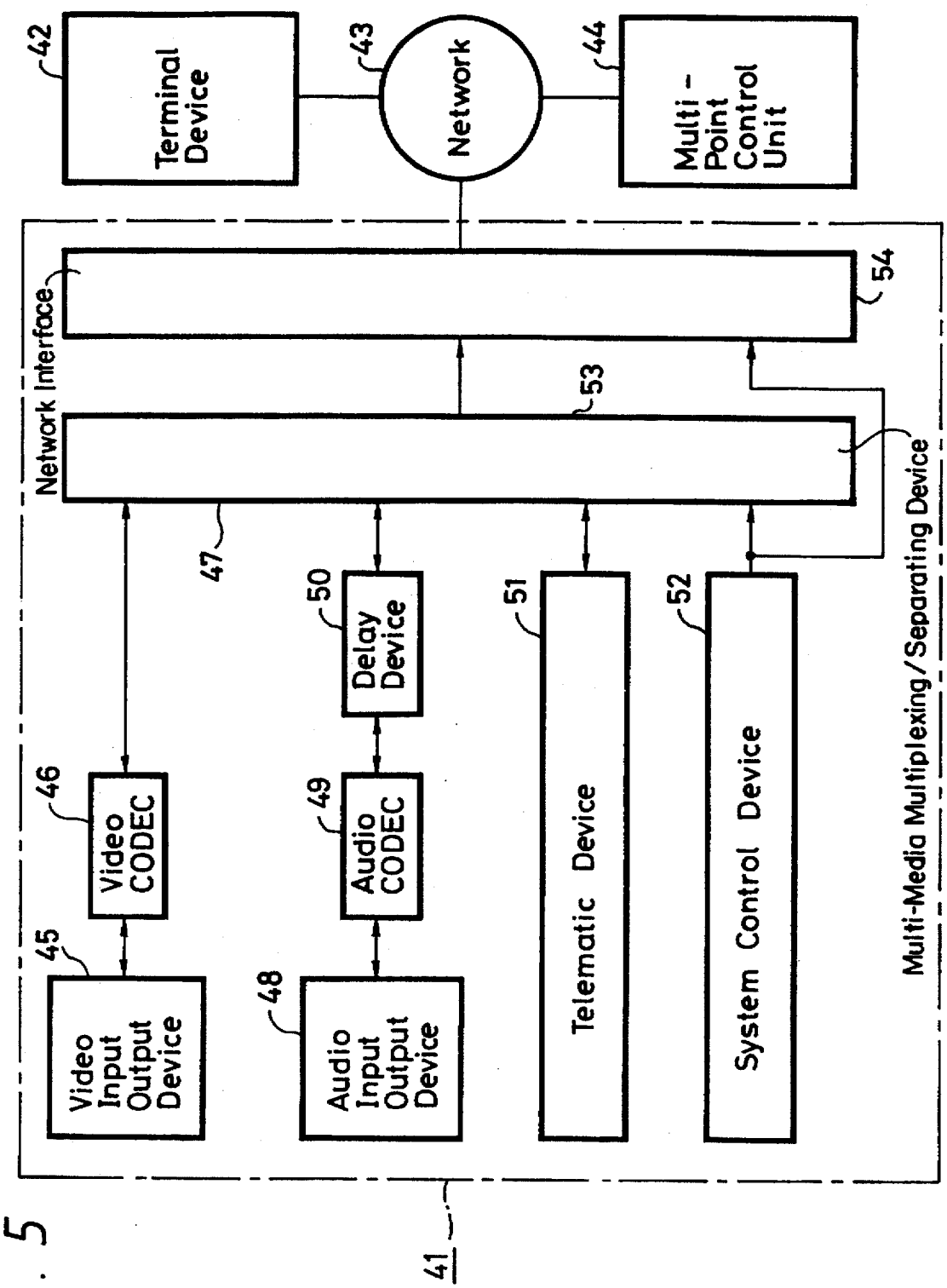
FIG. 5 is a block diagram showing an arrangement of a videoconferencing system.
Figure 6:
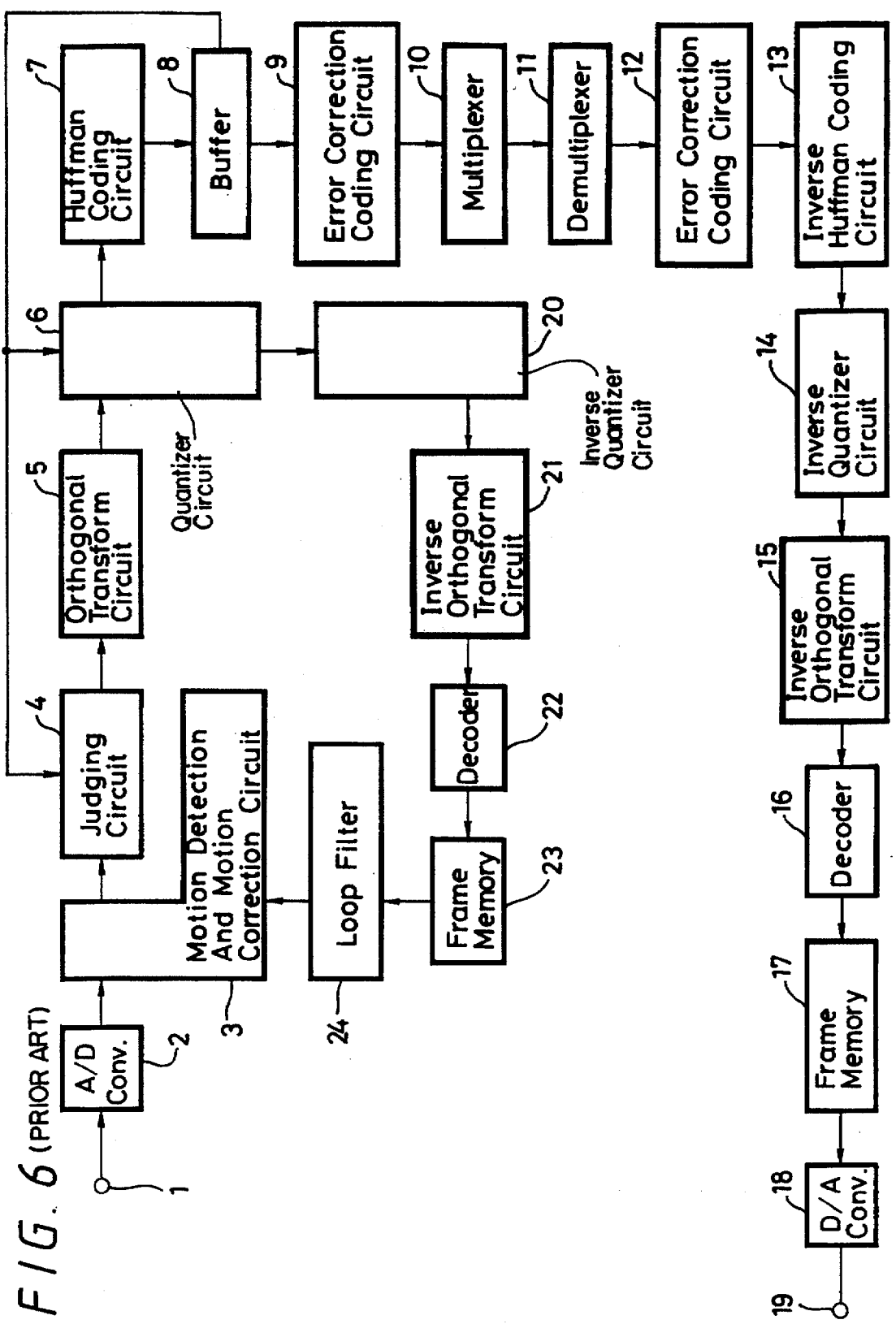
FIG. 6 is a block diagram showing an example of transmitting apparatus and receiving apparatus according to the prior art.

The orthogonal transform circuit 28 converts the image data read out from the memories 27a to 27d or intra-mode image data directly supplied thereto from the A/D converter circuit 26 in the form of time base data to frequency axis data in the unit of block formed of 8×8 pixels described with reference to FIG. 1 to thereby obtain compressed data having improved transmission efficiency. This image data is supplied to one fixed contact 29a of a switch 29 that is part of the judging circuit 30.

The motion detection and motion correction circuit 31 carries out the motion detection and motion correction of the image data a, b, c and d stored in the memories 27a to 27d or the image data directly supplied thereto from the A/D converter circuit 26 at the unit of 16×16 pixels, for example, on the basis of image data of a previous frame supplied thereto from the frame memory 38 through the loop filter 39.

The moving image data or still image data a, b, c and d from the motion detection and motion correction circuit 31 and the image data of a previous frame processed by the motion detection and motion correction circuit 31 are supplied to a subtracting circuit 32 and thereby subtracted by the subtracting circuit 32.

An interframe difference signal from the subtracting circuit 32 is supplied to the orthogonal converting circuit 33, in which it is converted in the form of time base data to frequency axis data similarly to the above-mentioned orthogonal transform circuit 28 and then supplied to the other fixed contact 29b of the switch 29 included in the judging circuit 30.

The judging circuit 30 connects a movable contact 29c of the switch 29 to the fixed contact 29a or 29b on the basis of the overflow information from a buffer (transmission buffer) 41 or the result provided by an algorithm by which it is determined whether image data is transmitted in the inter-mode or intra-mode, which will be described later.

More specifically, when the overflow information is supplied from the buffer 41 or it is determined by the judging circuit 30 on the basis of the result provided by the algorithm that image data is transmitted in the inter-mode, then the movable contact 29c of the switch 29 is connected to the fixed contact 29b to thereby supply the inter-mode image data to the quantizer circuit 34. In other cases or when it is determined on the basis of the result provided by the algorithm that image data is transmitted in the intra-mode, then the movable contact 29c of the switch 29 is connected to the fixed contact 29a to thereby supply the intra-mode image data to the quantizer circuit 34.

The quantizer circuit 34 quantizes the image data from the judging circuit 30 at the unit of macro-block that was described with reference to FIG. 1. Then, the quantizer circuit 34 supplies the thus quantized image data of the macro-block unit to the Huffman coding circuit 40 and to the inverse quantizer circuit 35.

The inverse quantizer circuit 35 inversely quantizes the image data of the macro-block unit from the quantizer circuit 34 and supplies the image data thus inversely quantized to the inverse orthogonal transform circuit 36.

The inverse orthogonal transform circuit 36 converts the frequency axis image data from the inverse quantizer circuit 35 to the time axis image data and supplies the image data thus converted into a decoder 49.

The decoder 49 writes the image data from an inverse orthogonal transform circuit 48 in a frame memory 38.

The image data written in the frame memory 38 is supplied to the above motion detection and motion correction circuit 31 through a loop filter 39 which eliminates a distortion component between the blocks.

The image data, quantized by the Huffman coding circuit 40, is supplied through the buffer 41 to an error correction coding circuit 42.

The image data from the buffer 41 is added with the error correction code by this error correction coding circuit 42 and then supplied to a multiplexer 43, in which it is multiplexed with other informations and then transmitted to the receiving side.

A demultiplexer 44 on the receiving side obtains image data from the data supplied thereto from the multiplexer 43 and supplies this image data (including the image identifier in the case of the still image mode) to an error correction coding circuit 45.

The image data, thus error-corrected by the error correction coding circuit 45, is supplied to an inverse Huffman coding circuit 46 and reconverted into the quantized data by this inverse Huffman coding circuit 46. This quantized data from the inverse Huffman coding circuit 46 is supplied to an inverse quantizer circuit 47 and then converted into the frequency axis image data by this inverse quantizer circuit 47.

The above image data is inversely converted from the frequency axis data to the time axis data by the inverse orthogonal transform circuit 48 and then fed to a decoder 49.

The image data, decoded by this decoder 49, is stored in a frame memory 50 and then selected so that, in the still image mode, it is stored in one of memories 53a, 53b, 53c and 53d comprising memory 53 on the basis of the identifying data added to respective still image data. Whereas, in the moving image mode, the above image data is supplied through the selector 51 to a D/A converter 54, in which it is converted into an analog video signal. This analog video signal is delivered through an output terminal 55.

In the still image mode, the selector 51 responds to a control signal from a detector circuit 52 to allow the image data read out from the frame memory 50 to be written in any one of the memories 53a, 53b, 53c and 53d in response to the identifying data added to the image data.

The detector circuit 52 detects the proper image data from the above image data a, b, c, and d on the basis of the image identifiers added to the image data from the inverse Huffman coding circuit 46 and supplies the control signal to the selector 51 in response to the detected result.

In the case of the still image mode, the image data a, b, c and d read out from the memory 53 are supplied to the D/A converter 54 as one still picture image, in which it is converted into an analog video signal. This analog video signal is output through an output terminal 55 to an external device (e.g., television receiver, etc.).

Therefore, when this analog still picture image is displayed on the picture screen of a monitor receiver or the like, a still picture image having four times as many pixels as the CIF image, i.e., a resolution as high as twice that of the CIF image can be displayed on the picture screen.

A communication flowchart in the above information transmitting apparatus will be described below with reference to FIG. 8. In this case, FIG. 8 is formed of FIGS. 8A and 8B drawn on two sheets of drawings so as to permit the use of a suitably large scale.

Figure 8B:
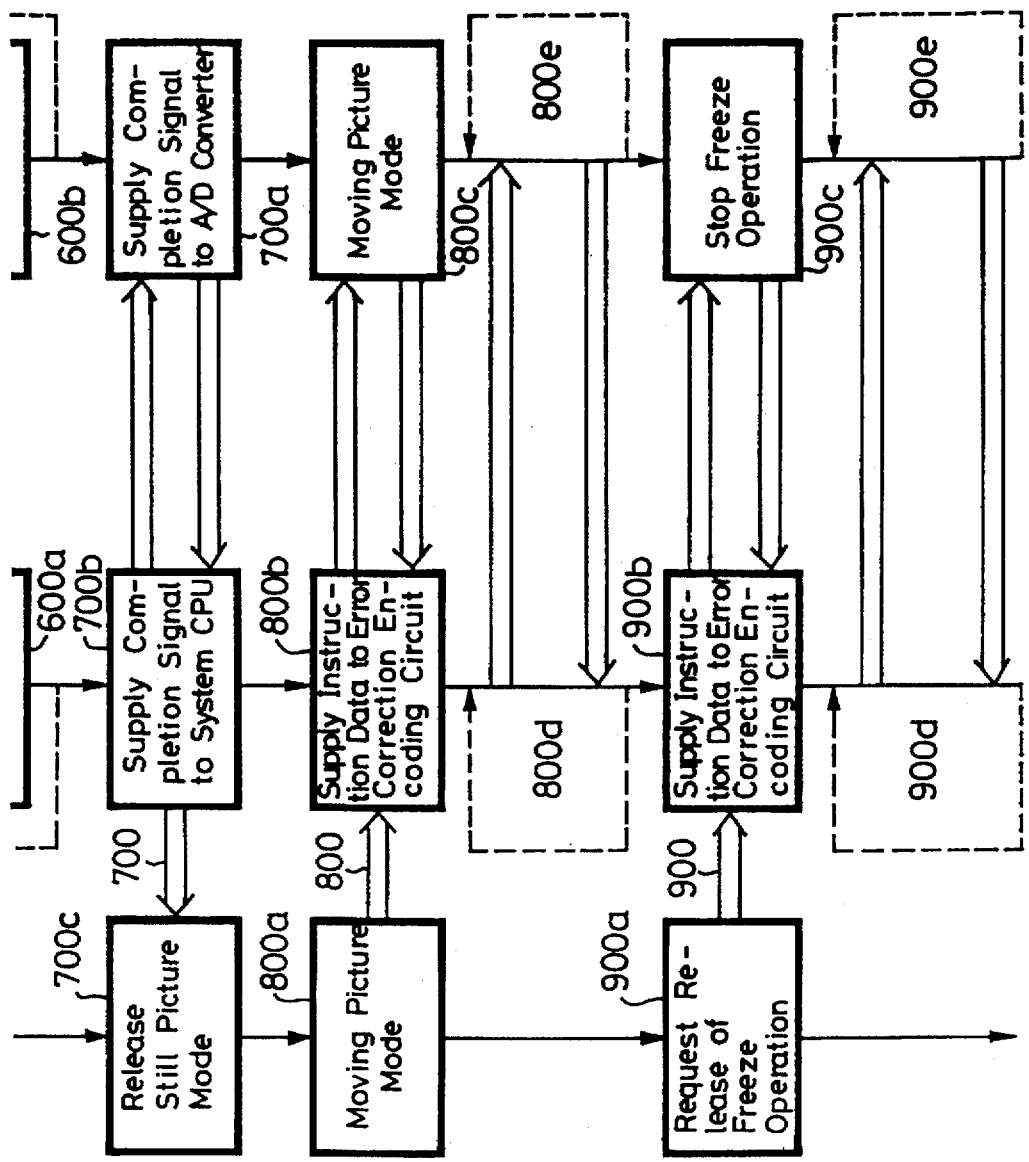
FIG. 8 shows the interlocking of FIGS. 8A and 8B, which together are a diagram of a communication flowchart used to explain the information transmitting apparatus and information receiving apparatus according to the embodiment of the present invention.

In FIGS. 8A, 8B, fine solid lines and arrows represent flows of processing, broken-line arrows with numbers represent flow of processings which are to be repeated and open arrows represent flows of communication processing among respective circuits, respectively.

In step 100a of the moving image mode, instruction data and image data from the A/D converter 2 are supplied to the error correction coding circuit 42.

At that time, a bit 3 in the instruction signal is made "0"(release off) and a bit 2 thereof is made "0"(document camera off).

In step 100b, the error correction coding circuit 42 transmits the moving image through the multiplexer 43 on the basis of the above instruction signal and also supplies a completion signal to the A/D converter 26.

The above-mentioned operation, i.e., the supply of the instruction data and the image data to the error correction coding circuit 42 by the A/D converter 26 and the supply of the completion signal to the A/D converter 26 by the error correction coding circuit 42 are repeated, thereby the moving image data being transmitted through the multiplexer 44.

In the next step 200a, the system CPU requests a freeze picture on the multiplexer 43.

In step 200b, the multiplexer 43 responds to the request from the system CPU to supply the decoder 37 with a control signal which enables the decoder 37 to perform the freeze picture operation.

In step 200c, the completion signal from the decoder 37 is supplied to the multiplexer 43 and the multiplexer 43 supplies a signal representative of the completion of the operation to the system CPU.

In step 200d, the system CPU is set in the freeze picture mode.

In step 300a, the system CPU is set in the still image mode and a control signal indicating that the system CPU is placed in the still image mode is supplied to the A/D converter 26.

In step 300b, the A/D converter 26 supplies a freeze request instruction data to the error correction coding circuit 42 in response to the control signal from the system CPU.

That is, a bit 3 of this instruction data is made "0"(release on), a bit 2 thereof is made "0"(document camera off) and further, the CODEC is forced to generate a meaningless block.

In step 300c, the error correction coding circuit 42 performs the picture freeze operation and supplies the completion signal to the A/D converter 26.

Accordingly, the image is not updated while the connected state is maintained.

In step 400a in the picture freeze mode, the A/D converter 26 supplies the instruction data to the error correction coding circuit 42 and allows the memory 27 to store the still image data.

In step 400b, the error correction coding circuit 42 supplies the completion signal to the A/D converter 26.

The operations of these steps 400a and 400b are repeated four times, whereby the still image data are stored in these memories 27a, 27b, 27c and 27d, in that order.

At step 500a in the still image mode 500, the A/D converter 26 supplies to the error correction coding circuit 42 with instruction data that is used to prepare the transmission of still image.

More specifically, in the above step 500a, a document camera signal (see FIG. 9B) that is the bit 2 of the instruction data is made "1"(document camera on) in synchronism with a vertical sync. (synchronizing) signal shown in FIG. 9A and the bit 3 is made "0"(release off).

In step 500b, the error correction coding circuit 42 supplies the A/D converter 26 with a completion signal representative of the fact that the preparation of the still image transmission is finished.

More specifically, in step 500b, when the error correction coding circuit 42 supplies the completion signal to the A/D converter 26, the A/D converter 26 supplies a trigger signal shown in FIG. 9C to the error correction coding circuit 42 in synchronism with the vertical sync. signal shown in FIG. 9A.

Now the transmission of the still image data is started. According to this embodiment, the first still image frame is progressively transmitted by using a plurality of moving image frames from a coarse quantization step size to a fine quantization step size.

That is, one moving picture frames of only the first still image frame are all transmitted in the intra-mode. If the quantization step is lowered to the minimum level, then the next still image frame is transmitted.

Similarly, the still image frame will hereinafter be transmitted as an inter-frame by using a plurality of moving image frames from coarse step size to fine step size.

A plurality of still image data are transmitted by repeating the above-mentioned methods.

From the second frame, the immediately-preceding frame and the pixel are adjoining each other and a correlation between the pixels is strong so that the still image data can be transmitted by processing only the difference information according to the orthogonal transform and quantization in the inter-mode.

More specifically, when the trigger signal shown in FIG. 9C is supplied to the error correction coding circuit 42, then the still image data of the first frame is read out from the memory 27a and then transmitted in the intra-mode by the multiplexer 43 as shown in FIG. 9D.

In step 600a of the mode 600 whereat the still image data is transmitted in the inter-mode, image data are sequentially read out from the memories 27b, 27c and 27d by the A/D converter 26 and then sequentially fed to the error correction coding circuit 42.

In step 600b, the error correction coding circuit 42 to which the image data is supplied from the A/D converter 26 supplies the trigger signal to the A/D converter 26 as shown in FIG. 9C.

Then, still image data, read out from the memories 27a, 27b, 27c and 27d, are transmitted by means of the multiplexer 43.

As shown in FIG. 9, each time the trigger signal (FIG. 9C) from the error correction coding circuit 42 goes to "1", as shown in FIG. 9D, the still image data of first to fourth frames (still image of only the first frame is first transmitted in the intra-mode) are sequentially transmitted in the inter-mode.

The above still image data are added with the identifying data representative of the memories 27a to 27d from which they are read out, and then transmitted to the receiving side, i.e., the demultiplexer 44.

As earlier noted with references to FIGS. 7A and 7B, then, when the identifying data of this still picture image data is judged by the selector 51, the still picture image data is written in any one of corresponding memories 53a, 53b, 53c and 53d by the selector 51. Further, after still picture image data of four frame amounts are written, they are converted into one still picture image data, converted into an analog still picture image signal by a D/A converter 54 and then delivered through an output terminal 55.

Then, this analog still picture image signal is displayed on a picture screen of a monitor receiver (not shown), for example, or the like that is connected to the output terminal 55, for example.

Since the analog still picture image signal, displayed on the picture screen of the monitor receiver (not shown), is constructed as one still picture image signal by the still picture image data of four frames, it has pixels as much as four times those of the CIF image based on the video CODEC recommendation H.261, i.e., a resolution as high as twice that of the CIF image.

While the still picture image signal having the pixels as much as four times those of the CIF image based on the video CODEC recommendation H.261 is obtained as described above, it is possible to obtain a still picture image having pixels as much as integral times those of the CIF image can be obtained.

At step 700a of the picture freeze mode 700, the error correction coding circuit 42 supplies the A/D converter 26 with a completion signal that represents the fact that the transmission of the still image data is completed.

In step 700b, the A/D converter 26 supplies the completion signal to the system CPU and also supplies the instruction data to the error correction coding circuit 42.

More specifically, the CODEC is forced to output stationary block data and inhibits the transmission of the still image data while maintaining the connected state.

In step 700c, the system CPU is supplied the completion signal from the A/D converter 26, thereby the still picture mode being released.

At step 800a in the moving picture mode 800, the system CPU is set in the moving picture mode, and the system CPU supplies the A/D converter 26 with a control signal representing that the system CPU is set in the moving picture mode.

At step 800b, the A/D converter 26 supplies instruction data to the error correction coding circuit 42 in response to the control signal from the system CPU.

That is, the bit 3 of the instruction data is set to "1"(release on).

At step 800c, the error correction coding circuit 42 is set in the moving image mode by the instruction data from the A/D converter 26. Also, the error correction coding circuit 42 supplies the completion signal to the A/D converter 26.

At step 800d, the instruction data and image data from the A/D converter 26 are supplied to the error correction coding circuit 42.

That is, as shown in FIG. 9B, the bit 2 of the instruction data is set to "0"(document camera off) and the bit 3 is set to "0"(release off).

At step 800e, the error correction coding circuit 42 supplies the completion signal to the A/D converter 26 and the transmission of image data can be effected by means of the multiplexer 43.

Then, at step 900a in a moving image mode 900, the system CPU supplies the A/D converter 26 with a control signal which request the decoder 37 to release the freeze operation.

At step 900b, the A/D converter 26 supplies the instruction data to the error correction coding circuit 42.

That is, the bit 2 of the instruction data is set to "20" (document camera off) and the bit 3 is set to "1"(release on).

At step 900c, the error correction coding circuit 42 stops the freeze operation of the decoder 37 in accordance with the control signal from the A/D converter 26 and supplies the completion signal to the A/D converter 26.

At step 900d, the image data (moving image data) from the A/D converter 26 and the instruction data are supplied to the error correction coding circuit 42.

That is, the bit 2 of the instruction data is set to "0" (document camera off) and the bit 3 is set to "0"(release off).

At step 900e, the error correction coding circuit 42 supplies the completion signal to the A/D converter 26 and transmits the image data (moving image data) through the multiplexer 43.

The way of how to judge the inter-mode and intra-mode will be described below.

According to this embodiment, after the orthogonal transform processing was carried out, it is determined whether image data is transmitted in the inter-mode or in the intra-mode.

According to the above-mentioned method, the reduction of frame and the control of the quantizer circuit 34 can be effected by one system so that circuits or the like can be mounted with ease and that the control operation can be carried out reliably.

An algorithm for determining the inter-mode and the intra-mode will be described. In this case, the calculation is carried out at the unit of macro-blocks on coefficients of four luminance blocks that was orthogonally transformed by the orthogonal transform circuit 28.

Fundamentally, since the squared values of AC components of the inter-mode and intra-mode or accumulatively-added values of absolute values are substantially corresponding to the coded amounts of the variable length coding process, the calculation is carried out by comparing them.

If the luminance change (DC component of the inter-block) of the whole block is smaller than a certain value, there is then the large possibility that this macro-block will be judged as a meaningless block. Therefore, the above macro-block is forcibly employed as the inter-block regardless of the judged result.

This will be summarized as follows:

That is the luminance change of the whole macro-block can be expressed by the following equation (1):

$$\text{Inter-DC} = \left| \sum_{i=0}^{3} \text{Inter}[Y(i)] \cdot \text{Coef}(0) \right| \quad (1)$$

Further, accumulatively-added values of the absolute values of the AC components in the inter-block and intra-block are respectively expressed by the following equations (2) and (3):

$$\text{Inter-ACsum} = \sum_{i=0}^{3} \sum_{j=1}^{n} |\text{Inter}[Y(i)] \cdot \text{Coef}(j)| \quad (2)$$

$$\text{Intra-ACsum} = \sum_{i=0}^{3} \sum_{j=1}^{n} |\text{Intra}[Y(i)] \cdot \text{Coef}(j)| \quad (3)$$

where n is 63.

Figure 10:
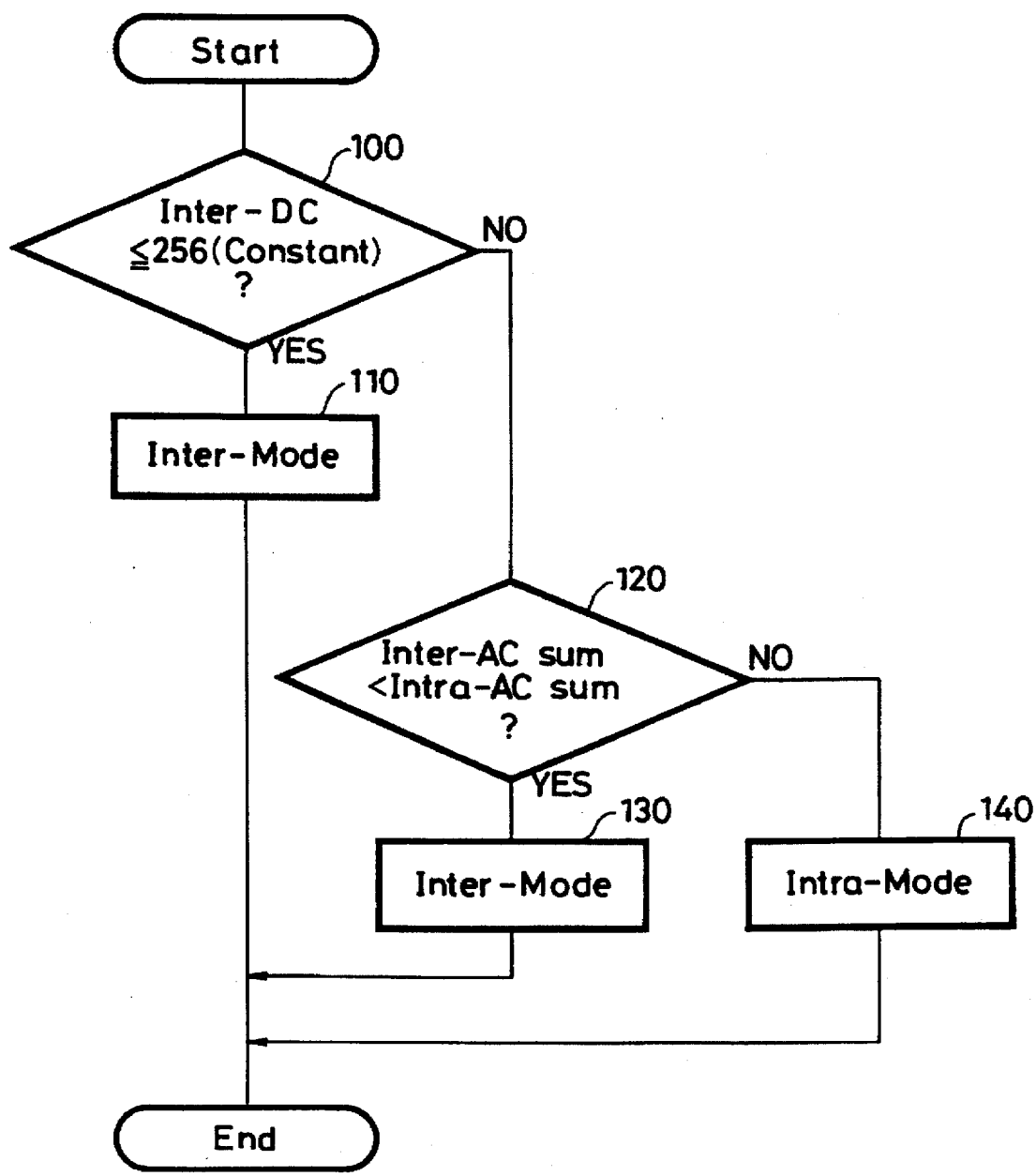
FIG. 10 is a flowchart to which references will be made in explaining operation of the information transmitting and information receiving apparatus according to the embodiment of the present invention.

According to the above equations (1), (2) and (3), the judgement algorithm becomes as shown in a flowchart forming FIG. 10.

This judgement algorithm will be described with reference to the flowchart of FIG. 10.

Referring to FIG. 10, following the Start of operation, it is determined at decision step 100 whether or not inter-DC is less than or equal to 256 (inter-DC ≦256). If a YES is output at decision step 100, then the processing proceeds to step 110. If on the other hand a NO is an answer at decision step 100, then the processing proceeds to decision step 120.

That is, in decision step 100, the DC component of the inter-mode is calculated at the unit of macro-blocks and the calculated value is less than or equal to the constant 256.

In step 110, the inter-mode is presented, i.e., image data to be transmitted is set in the inter-mode.

That is, the judging circuit 30 described with reference to FIG.7 connects the movable contact 29c of the switch 29 to the inter-mode fixed contact 29b.

Therefore, the inter-mode image data from the orthogonal transform circuit 33 is supplied to the multiplexer 43 through the switch 29 of the judging circuit 30, the quantizer circuit 34, the Huffman coding circuit 40, the transmission buffer 41 and the error correction coding circuit 42 and then transmitted from the multiplexer 43.

At decision step 120, it is determined whether or not inter-ACsum is less than intra-ACsum. If a YES is output at decision step 120, then the processing proceeds to step 130. Whereas, if a NO is output at decision step 120, then the processing proceeds to step 140.

More specifically, at decision step 120, the AC component of the inter-mode image data is calculated at the unit of macro-blocks to thereby calculate the absolute value thereof, i.e., the weight of the power. Similarly, the AC component of the intra-mode image data is calculated at the unit of macro-blocks to thereby calculate the absolute value thereof, i.e., the weight of the power. Then, it is determined whether the weight of the power in the inter-mode is smaller than that of the power in the intra-mode.

In step 130, the inter-mode is presented, i.e., image data to be transmitted is set in the inter-mode.

That is, the judging circuit 30 that was described with reference to FIGS. 7A, 7B connects the movable contact 29c of the switch 29 to the inter-mode fixed contact 29b.

Therefore, the image data of the inter-mode from the orthogonal transform circuit 33 is supplied through the switch 29 of the judging circuit 30, the quantizer circuit 34, the Huffman coding circuit 40, the transmission buffer 41 and the error correcting coding circuit 42 to the multiplexer 43 and then transmitted from the multiplexer 43.

In step 140, the intra-mode is presented, i.e., image data to be transmitted is set in the intra-mode.

That is, the judging circuit 30 that was described with reference to FIGS. 7A, 7B connects the movable contact 29c of the switch 29 to the intra-mode fixed contact 29a.

Therefore, the image data of the intra-mode from the orthogonal transform circuit 28 is supplied to the switch 29 of the judging circuit 30, the quantizer circuit 34, the Huffman coding circuit 40, the transmission buffer 41 and the error correction encoding circuit 42 to the multiplexer 43 and then transmitted from the multiplexer 43.

As described above, according to this embodiment, since motion picture image data are respectively stored in the frame memories 27a, 27b, 27c and 27d of four frames and sequentially transmitted when the still picture is transmitted, an image having a resolution as high as integral times that of the image based on the CIF can be transmitted even in the format based on the video CODEC recommendation H.261. Further, since the image data of the inter-mode and intra-mode are respectively processed by the orthogonal transform methods and then it is determined whether the inter-mode image or the intra-mode image is transmitted, the control points based on the feedback from the transmission buffer 41 can be concentrated to one point and therefore the control operation can be centralized, which can improve a system controllability. Also, the processing system can be simplified and the hardware can be reduced in cost.

According to the present invention, since frames N (N is an integer) times the transmission frame are prepared, a first pixel is stored in a first frame memory, a second pixel is stored in a second frame memory, ..., N−1'th pixel is stored in N−1'th frame memory, and N' th pixel is stored in N' th frame memory, thereby obtaining a still picture having pixels the number of which is integral times the number of pixels in a designated moving picture transmission system, there is then the advantage such that a still picture having a resolution higher than that of the image according to the designated moving picture transmission system can be transmitted.

Also, according to the present invention, since frames N (N is an integer) times the transmission frame are prepared, a first pixel is stored in a first frame memory, a second pixel is stored in a second frame memory, ..., N−1'th pixel is stored in N−1 'th frame memory, and N' th pixel is stored in N' th frame memory, thereby receiving a still picture having pixels the number of which is integral times the number of pixels in a designated moving picture transmission system, there is then the advantage such that a still picture having a resolution higher than that of the image according to the designated moving picture transmission system can be received.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for compressing a digital image signal representing both motion picture and still picture digital data so that a common transmission format is used for both of compressed motion picture and compressed still picture digital data, comprising:

means for selecting one of a motion picture mode and a still picture mode;

means for sampling, when the still picture mode is selected, said still picture digital data representing a high resolution video image in accordance with a plurality of sampling clocks having different phases to produce a plurality of sample digital image signals;

storing means for storing each of said sample digital image signals, said storing means including a plurality of frame memories each for storing a respective one of said sample digital image signals and for reading out the respective stored sample digital image signal as a respective sample output signal; and means for compressing the sample output signals by producing a plurality of difference signals each representing a difference between sample digital image signals stored in respective successive frame memories, said difference signals forming said compressed still picture digital data which can be transmitted through a transmission channel having a predetermined transmission capacity.

2. The apparatus according to claim 1, further comprising an analog-to-digital converter for converting an analog image signal into said digital image signal.

3. The apparatus according to claim 1, wherein each of said sample digital image signals is combined with a respective identifier.

4. The apparatus according to claim 1, wherein each of said sample digital image signals has a plurality of pixels; and said means for compressing operates to difference each of said pixels of a sample digital image signal with a corresponding pixel of a different sample digital image signal to produce one of said difference signals.

5. An apparatus for decompressing a compressed digital image signal representing both standard resolution motion picture and high resolution still picture compressed digital data in a common transmission format and received through a reception channel having a predetermined reception capacity, comprising:

means for decompressing the compressed digital image signal to produce a recovered digital image signal, said recovered digital image signal representing a high resolution still picture being comprised of standard resolution frames representing samples of said high resolution still picture at respectively different phases, some of said standard resolution frames including difference data representing correlations between respective successive standard resolution frames;

means for extracting an indicator of one of a motion picture mode and a still picture mode from said compressed digital image signal;

means for storing said standard resolution frames of said recovered digital image signal when the still picture mode is indicated; and means for reading the stored standard resolution frames of said recovered digital image signal from said means for storing to produce a high resolution still picture.

6. An apparatus for decompressing a compressed digital image signal representing both motion picture and still picture compressed digital data in a common transmission format and received through a reception channel having a predetermined reception capacity, comprising:

means for decompressing the compressed digital image signal to produce a recovered digital image signal, said recovered digital image signal representing a still picture being comprised of standard resolution frames representing samples of said still picture at respectively different phases, some of said standard resolution frames including difference data representing correlations between respective successive standard resolution frames;

means for extracting an indicator of one of a motion picture mode and a still picture mode from said compressed digital image signal; and means for storing said recovered digital image signal when the still picture mode is indicated, said means for storing including a plurality of frame memories each of which stores a respective one of said standard resolution frames.

7. The apparatus according to claim 6, wherein said still picture compressed digital data represents a high resolution signal, and each of said frame memories has a capacity of one frame of a standard resolution signal.

8. An apparatus for decompressing a compressed digital image signal representing both motion picture and still picture compressed digital data in a common transmission format and received through a reception channel having a predetermined reception capacity, comprising:

means for decompressing the compressed digital image signal to produce a recovered digital image signal, said recovered digital image signal representing a high resolution still picture being comprised of standard resolution frames representing samples of said high resolution still picture at respectively different phases, some of said standard resolution frames including difference data representing correlations between respective successive standard resolution frames;

means for extracting an indicator of one of a motion picture mode and a still picture mode from said compressed digital image signal;

means for storing each of said standard resolution frames when the still picture mode is indicated; and selector means for preventing said standard resolution frames of said recovered digital image signal from being stored in said means for storing when the motion picture mode is indicated.

9. A method for compressing a digital image signal representing both motion picture and still picture digital data so that a common transmission format is used for both of compressed motion picture and compressed still picture digital data, comprising the steps of:

selecting one of a motion picture mode and a still picture mode;

sampling, when the still picture mode is selected, said still picture digital data representing a high resolution video image in accordance with a plurality of sampling clocks having different phases to produce a plurality of sample digital image signals;

storing each of said sample digital image signals in a plurality of frame memories each for storing a respective one of said sample digital image signals and for reading out the respective stored sample digital image signal as a respective sample output signal; and compressing the sample output signals by producing a plurality of difference signals each representing a difference between sample digital image signals stored in respective successive frame memories, said difference signals forming said compressed still picture digital data which can be transmitted through a transmission channel having a predetermined transmission capacity.

10. A method for decompressing a compressed digital image signal representing both standard resolution motion picture and high resolution still picture compressed digital data in a common transmission format and received through a reception channel having a predetermined reception capacity, comprising the steps of:

decompressing the compressed digital image signal to produce a recovered digital image signal, said recovered digital image signal representing a high resolution still picture being comprised of standard resolution frames representing samples of said high resolution still picture at respectively different phases, some of said standard resolution frames including difference data representing correlations between respective successive standard resolution frames;

extracting an indicator of one of a motion picture mode and a still picture mode from said compressed digital image signal;

storing said standard resolution frames of said recovered digital image signal when the still picture mode is indicated; and reading the stored standard resolution frames of said recovered digital image signal to produce a high resolution still picture.

11. An apparatus for compressing a digital image signal representing both motion picture and high resolution still picture digital data so that a common transmission format is used for both of compressed motion picture and compressed still picture digital data, comprising:

means for selecting one of a motion picture mode and a still picture mode;

means for sampling, when the still picture mode is selected, said still picture digital data representing a high resolution video image in accordance with a plurality of sampling clocks having different phases to produce a plurality of sample digital image signals;

storing means for storing each of said sample digital image signals, said storing means including a plurality of frame memories each having a capacity of one frame of a standard resolution signal for storing a respective one of said sample digital image signals and for reading out the respective stored sample digital signal as a respective sample output signal; and means for compressing the sample output signals by producing a plurality of difference signals each representing a difference between sample digital image signals stored in respective successive frame memories, said difference signals forming said compressed still picture digital data which can be transmitted through a transmission channel having a predetermined transmission capacity.

12. A method for compressing a digital image signal representing both motion picture and high resolution signal still picture digital data so that a common transmission format is used for both of compressed motion picture and compressed still picture digital data, comprising the steps of:

selecting one of a motion picture mode and a still picture mode;

sampling, when the still picture mode is selected, said still picture digital data representing a high resolution video image in accordance with a plurality of sampling clocks having different phases to produce a plurality of sample digital image signals;

storing said sample digital image signals in a plurality of frame memories each having a capacity of one frame of a standard resolution signal for storing a respective one of said sample digital image signals and for reading out the respective stored sample digital signal as a respective output signal; and compressing the sample output signals by producing a plurality of difference signals each representing a difference between sample digital image signals stored in respective successive frame memories, said signals forming said compressed still picture digital data which can be transmitted through a transmission channel having a predetermined transmission capacity.

13. A method for decompressing a compressed digital image signal representing both motion picture and still picture compressed digital data in a common transmission format and received through a reception channel having a predetermined reception capacity, comprising the steps of:

decompressing the compressed digital image signal to produce a recovered digital image signal, said recovered digital image signal representing a high resolution still picture being comprised of standard resolution frames representing samples of said high resolution still picture at respectively different phases, some of said standard resolution frames including difference data representing correlations between respective successive standard resolution frames;

extracting an indicator of one of a motion picture mode and a still picture mode from said compressed digital image signal; and storing each of said standard resolution frames of said recovered digital image signal in a respective one of a plurality of frame memories when the still picture mode is indicated.

14. An apparatus for compressing a digital signal representing a high resolution video image, comprising:

means for receiving said digital signal representing a high resolution video image;

means for sampling said digital signal using a plurality of sampling clocks having respectively different phases to produce a plurality of sample digital signals, each of said sample digital signals representing a respective lower resolution video image;

a plurality of storage means each for storing a respectively different one of said sample digital signals;

means for differencing at least one of said sample digital signals stored in the respective storage means with a different one of said sample digital signals to produce a difference signal; and means for outputting said difference signal as a compressed digital signal.

15. The apparatus according to claim 14, wherein each of said sample digital signals has a plurality of pixels; and said means for differencing produces said difference signal by differencing each of said pixels in said at least one of said sample digital signals with a corresponding pixel in said different one of said sample digital signals.

16. The apparatus according to claim 15, wherein each of said pixels in said at least one of said sample digital signals is adjacent to each said respective corresponding pixel in said digital signal representing said high resolution video image.

17. The apparatus according to claim 14, wherein said means for outputting outputs said different one of said sample digital signals along with said difference signal as said compressed digital signal.

* * * * *